(12) United States Patent
Wang

(10) Patent No.: US 12,686,157 B2
(45) Date of Patent: Jul. 21, 2026

(54) SYSTEM AND METHOD FOR CONTINUOUSLY MANUFACTURING CURED MEMBRANES

(71) Applicant: Amrize Technology Switzerland LLC, Zug (CH)

(72) Inventor: Hao Wang, Carmel, IN (US)

(73) Assignee: Amrize Technology Switzerland LLC, Zug (CH)

( * ) Notice: Subject to any disclaimer, the term of this patent is extended or adjusted under 35 U.S.C. 154(b) by 54 days.

(21) Appl. No.: 18/557,197

(22) PCT Filed: Apr. 27, 2022

(86) PCT No.: PCT/US2022/026600
§ 371 (c)(1),
(2) Date: Oct. 25, 2023

(87) PCT Pub. No.: WO2022/232319
PCT Pub. Date: Nov. 3, 2022

(65) Prior Publication Data
US 2024/0208128 A1 Jun. 27, 2024

Related U.S. Application Data

(60) Provisional application No. 63/180,211, filed on Apr. 27, 2021.

(51) Int. Cl.
*B29C 48/08* (2019.01)
*B29B 7/48* (2006.01)
(Continued)

(52) U.S. Cl.
CPC .............. *B29C 48/08* (2019.02); *B29B 7/485* (2013.01); *B29B 7/82* (2013.01); *B29B 7/847* (2013.01);
(Continued)

(58) Field of Classification Search
None
See application file for complete search history.

(56) References Cited

U.S. PATENT DOCUMENTS 6,221,965 B1 4/2001 Grabner et al.
2010/0001435 A1 1/2010 Manley et al.
(Continued)

FOREIGN PATENT DOCUMENTS

DE 19939075 B1 2/2001
EP 1078968 A1 2/2001
(Continued)

OTHER PUBLICATIONS

Caretta EP0911359A1 English Translation 1997 (Year: 1997).*
(Continued)

*Primary Examiner* — Jacob T Minskey
*Assistant Examiner* — Adrien J Bernard
(74) *Attorney, Agent, or Firm* — Renner, Kenner; Arthur M. Reginelli

(57) ABSTRACT

A process for the continuous production of cured rubber membrane, the process comprising (i) preparing a continuous stream of curable rubber composition; (ii) forming the continuous stream of curable rubber composition into a continuous green-rubber extrudate; (iii) curing the continuous green-rubber extrudate to form a continuous cured membrane; and (iv) fabricating the continuous cured membrane into rolls of cured membrane, where the curable rubber composition is characterized by at least one of a t90 at 190° C. of from about 1 to about 12 minutes and a T5 at 135° C. of from about 5 to about 20 minutes.

6 Claims, 3 Drawing Sheets

(51) Int. Cl.

| | |
|---|---|
| *B29B 7/82* | (2006.01) |
| *B29B 7/84* | (2006.01) |
| *B29B 7/88* | (2006.01) |
| *B29C 48/00* | (2019.01) |
| *B29C 48/28* | (2019.01) |
| *B29C 48/395* | (2019.01) |
| *B29C 48/44* | (2019.01) |
| *C08J 5/18* | (2006.01) |
| *C08K 13/02* | (2006.01) |
| *B29K 9/00* | (2006.01) |
| *B29K 23/00* | (2006.01) |
| *B29K 481/00* | (2006.01) |
| *B29K 507/04* | (2006.01) |
| *C08K 3/04* | (2006.01) |
| *C08K 3/06* | (2006.01) |
| *C08K 3/36* | (2006.01) |
| *C08K 5/40* | (2006.01) |
| *C08K 5/47* | (2006.01) |

(52) U.S. Cl.
CPC .............. *B29B 7/88* (2013.01); *B29C 48/022* (2019.02); *B29C 48/28* (2019.02); *B29C 48/397* (2019.02); *B29C 48/44* (2019.02); *C08J 5/18* (2013.01); *C08K 13/02* (2013.01); *B29K 2009/00* (2013.01); *B29K 2023/16* (2013.01); *B29K 2481/04* (2013.01); *B29K 2507/04* (2013.01); *C08J 2323/16* (2013.01); *C08K 3/04* (2013.01); *C08K 3/06* (2013.01); *C08K 3/36* (2013.01); *C08K 5/40* (2013.01); *C08K 5/47* (2013.01); *C08K 2201/014* (2013.01)

(56) References Cited

U.S. PATENT DOCUMENTS

| | | |
|---|---|---|
| 2013/0203942 A1 | 8/2013 | Kirchhoff et al. |
| 2016/0002383 A1 | 1/2016 | Beek |
| 2019/0047199 A1 | 2/2019 | Douglas et al. |

FOREIGN PATENT DOCUMENTS

| | | | | |
|---|---|---|---|---|
| EP | 0911359 A1 | | 4/2004 | |
| EP | 2550148 B1 | | 1/2013 | |
| IT | 0911359 A1 | * | 9/1997 | .............. B29B 7/60 |

OTHER PUBLICATIONS

International Search Report and Written Opinion for corresponding PCT/US2022/026600 dated Jun. 28, 2022 (15 pp).
40808EP European Search Report Feb. 14, 2025.

* cited by examiner

SYSTEM AND METHOD FOR CONTINUOUSLY MANUFACTURING CURED MEMBRANES

This application is a National-Stage application of PCT/US2022/026600 filed on Apr. 27, 2022, which claims the benefit of U.S. Provisional Application No. 63/180,211 filed on Apr. 27, 2021, which are incorporated herein by reference.

FIELD OF THE INVENTION

Embodiments of the present invention relate to a method for continuously manufacturing cured membranes. In certain embodiments, the method may include the continuous mixing of a vulcanizable rubber in a mixing extruder and the continuous curing of the rubber.

BACKGROUND OF THE INVENTION

Roofing systems often include water impermeable sheets of polymeric materials installed over a roof deck. The polymeric sheets, or membranes, may be formed from a variety of known polymeric materials. These membranes can be thermoformable or thermoset. For example, thermoset membranes may be prepared from ethylene-propylene-diene rubber (EPDM).

Roofing membranes are typically installed in an overlapping arrangement, with lap seams formed between adjacent membranes to maintain the integrity of the roofing system and prevent water infiltration. A variety of mechanisms and techniques are known in the art for securing these membranes to the roof surface. The same or similar membranes are also useful in other environments, such as, for example, geomembranes used in pond lining and other landscaping applications.

Known techniques and methods for forming cured membranes, including EPDM membranes, have proven to be largely successful. Advancements in manufacturing processes in recent years have led to improved product quality and manufacturing efficiencies, which has led to an overall growth in the popularity of cured roofing membranes. However, further improvements of the methods and techniques for producing EPDM sheets are desired. One significant deficiency of prior art methods for manufacturing the EPDM sheets is the fact that batch processes employed. The vulcanizable rubber composition is often mixed in one or more batch processes that are both time consuming and labor intensive. In addition, curing of the EPDM sheets is often performed in batch processes by curing rolls of the EPDM sheet in curing ovens or autoclaves. These batch processes can slow production and increase costs.

Systems and methods for the continuous manufacture of cured membranes have also been proposed. For example, U.S. Publication No. 2015/0076743 teaches a continuous method whereby entrapped gases are removed from the composition prior to curing the membrane. This can be accomplished by subjecting the composition to vacuum conditions within the mixing or conveying equipment. As a result, imperfections within the membrane are minimized without the need to apply forces to the membrane during curing. Curing is therefore simply achieved by the application of heat, such as hot air that can be supplied by a curing oven. This process nonetheless suffers from inefficiencies resulting from the rate of cure of the rubber composition. That is, curing is a function of both time and temperature, and in order to provide sufficient time, this patent publication proposes elaborate conveyor systems within the curing station in order to accommodate a relatively long cure time. Indeed, the rubber formulations employed in U.S. Publication No. 2015/0076743 are of the type disclosed in U.S. Publication No. 2006/0280892, which are formulated for high-pressure, high-temperature curing over extended periods.

Thus, there is a need for an improved system and method for manufacturing cured membranes that alleviates one or more of the deficiencies of the prior art and generally improves the art.

SUMMARY OF THE INVENTION

One or more embodiments of the present invention provide a process for the continuous production of cured rubber membrane, the process comprising (i) preparing a continuous stream of curable rubber composition; (ii) forming the continuous stream of curable rubber composition into a continuous green-rubber extrudate; (iii) curing the continuous green-rubber extrudate to form a continuous cured membrane; and (iv) fabricating the continuous cured membrane into rolls of cured membrane, where the curable rubber composition is characterized by at least one of a t90 at 190° ° C. of from about 1 to about 12 minutes and a T5 at 135° C. of from about 5 to about 20 minutes.

Other embodiments of the present invention provide a system for continuously producing a curable rubber composition, the system comprising (i) a mixing and conveying device including first and second material inlets; (ii) a conveying device downstream of said mixer and conveying device downstream of said first extruder; and (iii) a conduit fluidly connecting said mixing and conveying device to said conveying device, said conduit including at least one outlet adapted to vent volatiles from the conduit.

Yet other embodiments of the present invention provide a method for preparing a curable rubber sheet, the method comprising (i) preparing a curable rubber composition within a mixing and conveying device; (ii) transferring the curable rubber composition to a conduit; (iii) removing volatiles from the curable rubber composition while the curable rubber composition is contained within said conduit; (iv) transferring the curable rubber composite from the conduit to a conveying device; and (v) extruding the curable rubber composition into an extrudate from the conveying device

DETAILED DESCRIPTION OF ILLUSTRATIVE EMBODIMENTS

Figure 1:
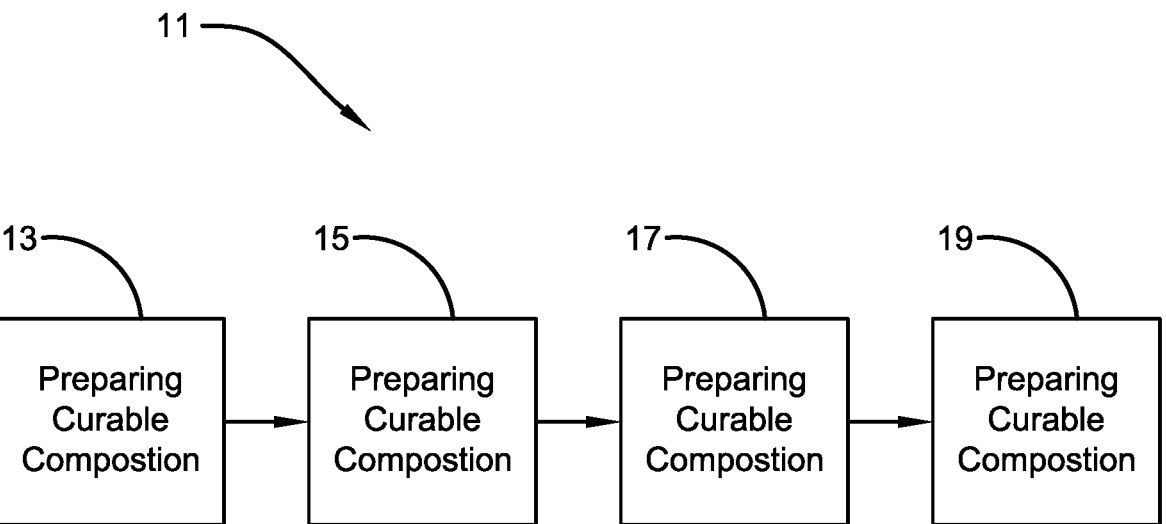
FIG. 1 is a flow diagram showing a process according to aspects of the invention.

Embodiments of the invention are based, at least in part, on the discovery of an efficient process for the continuous production of cured EPDM membranes. According to aspects of the invention, a fast-curing EPDM rubber composition is employed in combination with a complementary processing technique. The fast-curing EPDM rubber composition advantageously includes sulfur as a curative. For example, in one or more embodiments, the processing technique employs a temperature profile that provides, among several benefits, the ability to remove volatiles from the composition after introduction of the sulfur curative, as well as the ability to form an uncured membrane sheet below scorch temperatures.

Curable Rubber Composition

As indicated above, the EPDM membranes produced by the present invention are prepared from a fast-curing vulcanizable composition, which may also be referred to as a curable rubber composition, a vulcanizable EPDM composition, a curable EPDM composition, or simply a vulcanizable or curable composition. Generally speaking, some aspects of the curable EPDM compositions of the present invention are known to those skilled in the art as disclosed in U.S. Publication Nos. 2006/0280892, 2005/0076849, 2014/0373467, and 2016/0221309, which are incorporated herein by reference.

Characteristics of Curable Composition

In one or more embodiments, the vulcanizable compositions are characterized by a rate of cure that can be quantified by a t90. As a skilled person appreciates, t90 represents the time, at a specified temperature, required to achieve 90% cure of the rubber composition as determined by torque measurements. These measurements may be determined by rheometry. For purposes of this specification, and unless otherwise stated, cure characteristics are reported as determined by using a Rubber Processing Analyzer (RPA) such as the Premier RPA, which is available from Alpha Technologies.

In one or more embodiments, the curable compositions of the present invention are characterized by a t90 at 190° ° C. of greater than 1 minute, in other embodiments greater than 2 minutes, and in other embodiments greater than 3 minutes. In these or other embodiments, the curable composition is characterized by a t90 at 190° C. of less than 12 minutes, in other embodiments less than 10 minutes, in other embodiments less than 8 minutes, and in other embodiments less than 7 minutes. In one or more embodiments, the curable composition is characterized by a t90 at 190° C., of from about 1 to about 12 minutes, in other embodiments from about 2 to about 8 minutes, in other embodiments from about 2 to about 11 minutes, in other embodiments from about 3 to about 7 minutes, and in other embodiments from about 3 to about 10 minutes.

In these or other embodiments, the curable compositions can be characterized by T5. As the skilled person appreciates, T5 represents scorch time at lower temperatures (e.g. 135° C.) and represents the time taken from the beginning of the warm-up period of the sample and extends to that point in time at which the viscosity (e.g. Mooney Viscosity) rises five units above the minimum value.

In one or more embodiments, the curable compositions of the present invention are characterized by a T5 at 135° C. of greater than 5 minutes, in other embodiments greater than 6 minutes, in other embodiments greater than 7 minutes, in other embodiments greater than 8 minutes, in other embodiments greater than 10 minutes, in other embodiments greater than 10 minutes, and in other embodiments greater than 12 minutes. In these or other embodiments, the curable composition is characterized by a T5 at 135° C. of less than 20 minutes, in other embodiments less than 18 minutes, in other embodiments less than 17 minutes, and in other embodiments less than 15 minutes. In one or more embodiments, the curable composition is characterized by a T5 at 135° C. of from about 5 to about 20, in other embodiments of from about 6 to about 18, in other embodiments of from about 8 to about 20, in other embodiments from about 10 to about 18, and in other embodiments from about 12 to about 15 minutes.

Constituents of Curable Composition

The membranes produced by the present invention are prepared by curing, which may also be referred to cross-linking, a vulcanizable composition, which may also be referred to as a curable rubber composition. In one or more embodiments, the vulcanizable composition includes a curable rubber, a filler, an extender, a sulfur curative, and a cure accelerator. Additionally, the vulcanizable compositions may include other constituents that are employed in rubber membranes or rubber compounds. For example, the vulcanizable compositions may include oil, wax, antioxidant, antiozonant, flame retardant, and the like. The skilled person appreciates that upon curing, the cured membranes include a polymeric network or matrix, which includes the cured residue of the vulcanizable rubber, and the various other ingredients may be dispersed throughout the polymeric network.

Curable Rubber

In one or more embodiments, the curable rubber, which may also be referred to as a crosslinkable rubber, is an olefinic polymer, which may also be referred to as an olefinic rubber. In one or more embodiments, the olefinic rubber is an olefinic terpolymer. In one or more embodiments, the olefinic terpolymer includes mer units that derive from the polymerization of ethylene, an alpha olefin, and optionally diene monomer.

Useful alpha-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publication No. 2006/0280892, both of which are incorporated herein by reference. Furthermore, olefinic terpolymers and methods for their manufacture as related to non-black membranes are known as disclosed in co-pending U.S. application Ser. Nos. 12/389,145, 12/982,198, and 13/287,417, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, and in other embodiments at least 3 weight percent mer units deriving from diene monomer; in these or other embodiments, the elastomeric terpolymer may include at most 6 weight percent, in other embodiments at most 5 weight percent, in other embodiments at most 4 weight percent, and in other embodiments at most 3.2 weight percent, mer units deriving from diene monomer. The skilled person understands that diene content of a polymeric composition is often determined based upon an average of the molecules within the entire composition and therefore the foregoing should be understood as an average. In one or more embodiments, the balance of the mer units derive from propylene or other alpha-olefins. In one or more embodiments, low Mooney EPDM terpolymers are blended with high Mooney EPDM terpolymers to reduce the overall viscosity of the membrane compound and thereby accommodate processing.

Sulfur Cure System

As suggested above, the vulcanizable compositions include a sulfur-based cure system. These systems are generally known in the art as described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxillary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Reference can also be made to U.S. Publication No. 2006/0280892, which is incorporated herein by reference.

In one or more embodiments, useful sulfur-based cure systems include sulfur or sulfur-containing curatives, which may collectively be referred to as sulfur vulcanizing agents. Useful sulfur vulcanizing agents include, but are not limited to, "rubbermaker's" soluble sulfur; sulfur-donating vulcanizing agents, such as an amine disulfide, polymeric polysulfide or sulfur olefin adducts; and insoluble polymeric sulfur. These sulfur vulcanizing agents may be used alone or in combination. Sulfur donor-type accelerators may be used in place of elemental sulfur or in conjunction with elemental sulfur if desired. As the skilled person appreciates, these sulfur vulcanizing agents may be used in conjunction with metal activators (e.g. zinc oxide) and organic acids (e.g. stearic acid).

In one or more embodiments, the curative is employed in combination with a cure accelerator. In one or more embodiments, accelerators are used to control the time and/or temperature required for vulcanization and to improve properties of the vulcanizate. Useful accelerators include thioureas, thiuram sulfides, benzothiazole sulfonamides, thiazoles, and dithiocarbamates. Exemplary thioureas include ethylene thiourea, N,N-dibutylthiourea, and N,N-diethylthiourea. Exemplary thiuram sulfides include tetramethylthiuram (TMTMS), tetrabutylthiuram disulfide (TBTDS), tetramethylthiuram disulfide (TMTDS), tetraethylthiuram monosulfide (TETMS), dipentamethylenethiuram tetrasulfide (DPTT), and dipentamethylenethiuram hexasulfide (DPTH). Exemplary benzothiazole sulfenamides include N-oxydiethylene-2-benzothiazole sulfenamide, N-cyclohexyl-2-benzothiazole sulfenamide, N,N-diisopropyl-2-benzothiazolesulfenamide, and N-tert-butyl-2-benzothiazole sulfenamide (TBBS). Exemplary thiazole accelerators include 2-mercaptobenzothiazole (MBT) 2-mercaptobenzothiazole, (MBTS) benothiazole disulfide (MBTS), N,N-diphenylguanadine, N,N-di-(2-methylphenyl)-guanadine, 2-mercaptobenzothiazole, 2-(morpholinodithio)benzothiazole disulfide, and zinc 2-mercaptobenzothiazole. Exemplary dithiocarbamates include tellurium diethyldithiocarbamate, copper dimethyldithiocarbamate, bismuth dimethyldithiocarbamate, cadmium diethyldithiocarbamate, lead dimethyldithiocarbamate, sodium butyldithiocarbamate zinc diethyldithiocarbamate, zinc dimethyldithiocarbamate, and zinc dibutyldithiocarbamate (ZDBDC). In particular embodiments, a benzothiazole sulfonamide is used as an accelerator. In these or other embodiments, a benzothiazole sulfonamide and a thiuram sulfide are employed as the accelerators. In these or other embodiments, a benzothiazole sulfonamide and a thiuram sulfide is employed as an accelerator in the absence of a thiazole. In one or more embodiments, dipentamethylenethiuram tetrasulfide and N-tertbutyl-2-benzothiazole sulfonamide are employed as the accelerators in the absence of a thiazole.

Filler

As mentioned above, the vulcanizable compositions include a filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Other useful fillers include clay and talc, such as those disclosed in U.S. Publication No. 2006/0280892, which is incorporated herein by reference. Still other useful fillers include silica, which may be used in conjunction with a coupling agent. For example, U.S. Pat. No. 8,367,760, which is incorporated herein by reference, discloses the preparation of silica-filled rubber membranes. Yet other useful fillers include mica, coal filler, ground rubber, titanium dioxide, and calcium carbonate.

Mica includes mixtures of sodium and potassium aluminum silicate. Micas include true micas, brittle micas, and interlayer-deficient micas. True micas include a majority of singularly charged ions (e.g., potassium and sodium) in the alpha position. Brittle micas include a majority of doubly charged ions (e.g., calcium or barium) in the alpha position. Interlayer-deficient micas include fewer cations in the interlayer (the layer between the tetrahedral-octahedral-tetrahedral layers of the crystalline structure) than true or brittle micas.

In one embodiment, mica is characterized as a platy, chemically inert filler having a specific gravity of from about 2.6 to about 2.7, a pH of about 7, and a moisture content of less than about 0.5 weight percent. Micas with a mean particle diameter of less than about 2 microns may be employed in one or more embodiments.

Coal filler includes ground coal. Ground coal may be characterized as a dry, finely dividing black powder derived from a low volatile bituminous coal. In one or more embodiments, ground coal is characterized by a particle size ranging from a 0.26 microns to a 2.55 microns with the average particle size of 0.69+/−0.46 microns as determined on 50 particles using Transmission Electron Spectroscopy. Ground coal may produce an aqueous slurry having a pH of about 7.0 when tested in accordance with ASTM D-1512. One particular ground coal is designated Austin Black™, which has a specific gravity of about 1.26+/−0.03, an ash content of about 5.0%, and a sulfur content of about 0.8%. Austin Black™ is commercially available from Coal Fillers, Inc. of Bluefield, VA.

Ground rubber includes cryogenically ground rubber. Cryogenically ground rubbers include cryogenically ground EPDM, butyl, neoprene, and mixtures thereof. In one embodiments, cryogenically ground EPDM rubber includes a fine black rubbery powder having a specific gravity of about 1.17 and a particle size ranging from about 30 to about 300 microns with an average particle size ranging from about 50 to about 80 microns.

Useful titanium dioxides include both rutile and anatase form of titanium dioxide. One useful commercial product is TiPure™ R-960 (DuPont), which is a fine, white powder having a specific gravity of 3.90.

Useful calcium carbonates include finely ground calcium carbonate. In one or more embodiments, the calcium carbonate may be characterized by a specific gravity of about 2.71. Commercially available forms are available from Harwick Chemical, J. M. Huber Corporation, Georgia Marble, Genstar Stone Products and Omya, Inc.

Extenders

As mentioned above, the vulcanizable compositions employed in manufacturing membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 285° C. Useful extenders are commercially available. One particular extender is a paraffinic oil available under the tradename SUNPAR (Sun Oil Company). Another useful paraffinic process oil is HYPRENE P150BS (Ergon Oil Inc. of Jackson, Miss.).

Other Constituents

In addition to the foregoing constituents, the vulcanizable compositions used to make membranes of this invention may also optionally include homogenizing agents, phenolic resins, flame retardants, zinc oxide, stearic acid, and mixtures thereof as disclosed in U.S. Publication No. 2006/0280892. Certain embodiments may be substantially devoid of any of these constituents.

Olefinic Rubber

In one or more embodiments, the rubber membranes produced by the process of this invention may include from about 20 to about 50, in other embodiments from about 24 to about 36, and in other embodiments from about 28 to about 32% by weight rubber (e.g., EPDM) based on the entire weight of the mixture.

Filler

In one or more embodiments, the rubber membranes produced by the process of this invention may include from about 70 to about 100 pbw, in other embodiments from about 75 to about 95 pbw, and in other embodiments from about 77 to about 85 parts by weight filler phr. Certain embodiments may be substantially devoid of filler.

Extenders

In one or more embodiments, the rubber membranes produced by the process of this invention may include from about 55 to about 100 pbw, in other embodiments from about 60 to about 95 pbw, and in other embodiments from about 65 to about 80 parts by weight extender phr. Certain embodiments may be substantially devoid of extender.

Curative

Suitable amounts of sulfur can be readily determined by those skilled in the art. In one or more embodiments, the vulcanizable composition may include from about 0.20 to about 3.5 pbw, in other embodiments from about 0.25 to 3.0 pbw, and in other embodiments from about 0.75 to about 2.0 pbw sulfur per 100 phr. In these or other embodiments, the vulcanizable compositions include greater than 1.0 pbw, in other embodiments greater than 1.25 pbw, and in other embodiments greater than 1.35 pbw sulfur phr.

The amount of accelerator can also be readily determined by those skilled in the art. In one or more embodiments, the vulcanizable composition may include from about 1.0 to about 12 pbw, in other embodiments from about 2.0 to about 9 pbw, in other embodiments from about 2.5 to about 8 pbw, and in other embodiments from about 2.75 to about 7 pbw accelerator phr. In particular embodiments, the vulcanizable composition includes from about 1 to about 4, in other embodiments from about 1.5 to about 3, and in other embodiments from about 1.75 to about 2.5 pbw of a benzothiazole sulfonamide, and from about 0.4 to about 2.25, in other embodiments from about 0.6 to about 1.5, and in other embodiments from about 0.75 to about 1.25 pbw of a thiuram sulfite.

Continuous Process

As suggested above, aspects of the invention are based on the use of a continuous process that is adapted to complement use of the fast-curing composition of the present invention. Generally speaking, the overall process of the present invention is a continuous process, which refers to a method where the curable composition is continuously formed and continuously fed to downstream steps that are likewise continuously performed. For example, these downstream steps may include continuously forming a green membrane from the curable composition and subsequently continuously curing the green membrane as it is conveyed downstream within the process. The skilled person readily understands the meaning associated with the term continuous process and/or continuous steps. For example, in the continuous formation of the curable composition, the ingredients are introduced to a vessel, such as a mixer or reactor, in a manner that continuously conveys the composition to downstream portions of the vessel or to downstream subsequent vessels and/or downstream processing steps. Some aspects of continuous processes for producing cured membrane are generally known as disclosed in U.S. Publication No. 2019/0047199, which is incorporated herein by reference.

With reference to FIG. 1, the continuous process 11 includes the step of continuously preparing the curable composition 13 (i.e. step 13), followed by a step of continuously forming a green rubber membrane 15 (i.e. step 15), followed by a step of continuously curing the green membrane 17 (i.e. step 17), and followed by a step of handling and fabricating the cured membrane 19 (i.e. step 19).

Preparing Curable Composition

Figure 2:
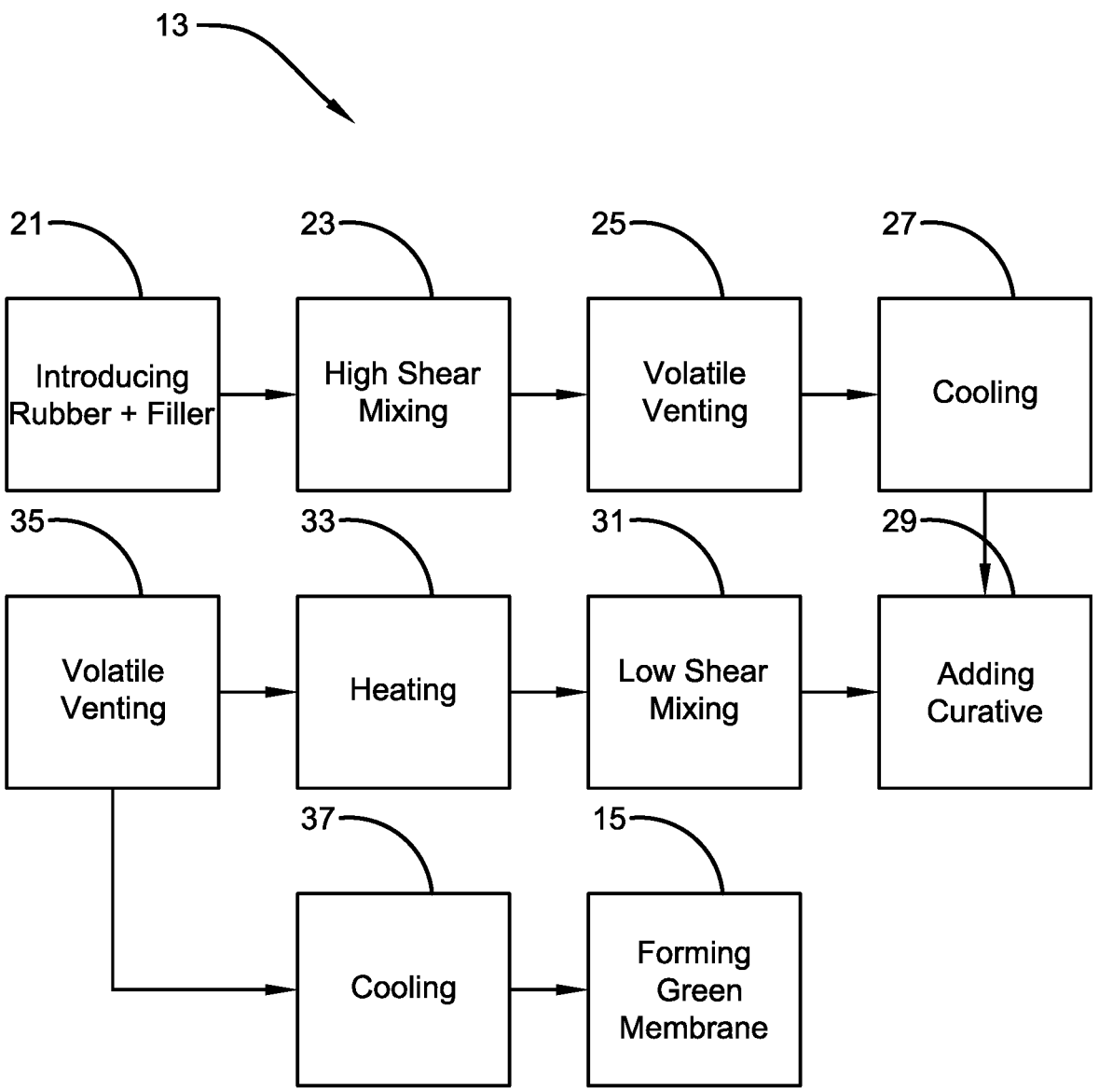
FIG. 2 is a flow diagram showing a process according to aspects of the invention.

The step of preparing the curable composition, which may be referred to as a vulcanizable composition or a curable rubber composition, can be described with reference to FIG. 2. As shown, step 13 includes sub-step 21 of introducing rubber and filler to an apparatus adapted to continuously mix and convey the resulting mixture, which may also be referred to as rubber mixture or rubber composition. In one or more embodiments, one or more of the other constituents of the curable rubber composition can also be introduced to the rubber mixture at or immediately after sub-step 21. In one or more embodiments, all ingredients except for the curative (and optional cure co-agents) are added at sub-step 21. The various additives introduced at sub-step 21 can be introduced simultaneously or sequentially. Where the constituents are introduced sequentially, the order of addition can be adapted by those having skill in the art to achieve certain processing goals such as processability. Also, one or more of the constituents can be pre-combined prior to introducing the constituents to the vessel in which mixing and conveying takes place.

Once the rubber, filler, and other optional ingredients are introduced to the mixing and conveying vessel, the rubber and filler (i.e. the rubber mixture) undergo high-shear mixing at a sub-step 23. Sub-step 23 may include mixing and masticating the rubber mixture in order to disperse the filler throughout the rubber. In one or more embodiments, sub-step 23 takes place at a temperature of greater than 130° C., in other embodiments greater than 140° C., in other embodiments greater than 150° C., in other embodiments greater than 160° C., and in other embodiments greater than 170° C. In these or other embodiments, sub-step 23 (i.e. high shear mixing) takes place at a temperature of from about 130 to about 180° C., in other embodiments from about 140 to about 175° C., in other embodiments from about 150 to about 195° C., in other embodiments from about 160 to about 190° C., and in other embodiments from about 170 to about 185° C. For purposes of this specification, and unless otherwise stated, the temperature of any step, such as sub-step 23, refers to the actual temperature of the composition within the step or sub-step.

In combination with or immediately following mixing 23, the method optionally includes a sub-step 25 of venting volatile compounds. These volatile compounds may include organic or inorganic compounds that volatilize, at atmospheric pressure, at temperatures greater than 130° C., in other embodiments greater than 140° C., and in other embodiments greater than 150° C. Accordingly, in one or more embodiments, sub-step 25 of venting volatiles takes place when the temperature of rubber composition is greater than 130° C., in other embodiments greater than 140° C., and in other embodiments greater than 150° C. In one or more embodiments, sub-step 25 takes place at a pressure below environmental pressure (i.e. under vacuum). For example, sub-step 25 may take place at a pressure of less than 80 kPa, in other embodiments less than 10 kPa, in still other embodiments less than 1.0 kPa, and in yet other embodiments less than 0.1 kPa.

Following sub-steps 23 and 25 (i.e. after high-shear mixing and venting), the rubber mixture is conveyed downstream and cooled or allowed to cool within cooling sub-step 27. In one or more embodiments, the rubber mixture is cooled or allowed to cool to a temperature of less than 130° C., in other embodiments less than 120° C., and in other embodiments less than 110° C. In these or other embodiments, cooling step 27 cools or allows the rubber mixture to cool to a temperature of from about 70 to about 130° C., in other embodiments from about 80 to about 120° C., and in other embodiments from about 90 to about 110° C.

Once the rubber mixture is cooled as set forth with respect to sub-step 27, the curative, as well as any cure co-agents, is introduced to the rubber mixture at step 29 to thereby form a curable rubber composition, which may also be referred to as a vulcanizable rubber composition. The curable rubber composition is then mixed to disperse the curative and any co-agent throughout the rubber mixture within low-shear mixing step 31. As the skilled person will appreciate, low-shear mixing step 31 can be adapted to ensure that the mixing energy does not result in a deleterious rise in the temperature of the curable rubber composition. In one or more embodiments, the temperature of the curable rubber composition during dispersion or mixing of the curative is maintained at a temperature of less than 140° C., in other embodiments less than 130° C., in other embodiments less than 120° C., and in other embodiments less than 110° C. In these or other embodiments, mixing sub-step 31 takes place at a temperature of from about 70 to about 140° C., in other embodiments from about 70 to about 130° C., in other embodiments from about 80 to about 120° C., and in other embodiments from about 90 to about 110° C.

Once the curable rubber mixture has been adequately mixed (i.e. the curative and any cure accelerators have been adequately mixed into the rubber mixture), the curable rubber composition is optionally heated (or the temperature is permitted to increase) in order to facilitate removal of volatile compounds. In one or more embodiments, this advantageously takes place in order to remove volatile compounds introduced with the curative and cure co-agents. In one or more embodiments, heating sub-step 33 heats the curable rubber composition to a temperature of greater than 130° C., in other embodiments greater than 135° C., and in other embodiments greater than 140° C. In these or other embodiments, heating sub-step 33 heats the vulcanizable rubber composition to a temperature of from about 120 to about 165° C., in other embodiments from about 133 to about 165° C., in other embodiments from about 135 to about 160° C., and in other embodiments from about 140 to about 155° C. The skilled person appreciates that heating the composition may take place by heat transfer, such as external heating or the use of heating fluids, or heat may result from mechanical energy bestowed on the composition (e.g. from shear forces transmitted by the mixing device). Similarly, cooling can take place by extracting heat from the composition by heat transfer such as may occur by use of cooling fluids, or cooling may occur by reducing mechanical forces (i.e. less shear) coupled with the dissipation of heat energy to the environment.

The curable rubber composition, which includes the curative and co-agents, is heated to the specified temperatures for only a limited time period, and then the curable composition is cooled or allowed to cool. The time that the curable composition is at the specified temperature is less than 5 minutes, in other embodiments less than 3.5 minutes, and in other embodiments less than 2 minutes. In one or more embodiments, the curable composition is maintained at an elevated temperature for about 30 seconds to about 5 minutes, in other embodiments from about 1 minute to about 3.5 minutes, and in other embodiments from about 1.5 minute to about 2.5 minutes.

While the curable composition is heated to the specified temperatures within heating sub-step 33, the curable composition undergoes volatile venting at sub-step 35. As with the previous sub-step 25, wherein volatile compounds are vented, volatile compounds are again vented in sub-step 35. As indicated above, venting step 35 may advantageously remove those volatile compounds introduced with the curative and co-agents. And, with the increase in temperature of the curable rubber composition through heating sub-step 33, volatile compounds are more efficiently removed within venting sub-step 35. As with previous venting sub-step 25, the pressure exerted on the composition (e.g. the environment in which the curable composition is conveyed) may be reduced to further enhance removal of volatile compounds; in other words, volatiles can be removed under vacuum. For example, sub-step 35 may take place at a pressure of less than 80 kPa, in other embodiments less than 10 kPa, in still other embodiments less than 1.0 kPa, and in yet other embodiments less than 0.1 kPa. In one or more embodiments, sub-step 35 of devolatilizing the composition takes place outside of the extrusion device in which the curative is introduced and mixed. This advantageously allows for exposing a greater amount of surface area, which facilitates removal of volatiles.

Following removal of volatile compounds at venting sub-step 35, the curable composition is cooled or allowed to cool within cooling sub-step 37. In one or more embodiments, cooling sub-step 37 lowers the temperature of the curable composition to less than 130° C., in other embodiments less than 120° C., and in other embodiments to less than 110° C. In these or other embodiments, the temperature of the curable composition as a result of cooling sub-step 37 is from about 70 to about 130° C., in other embodiments from about 80 to about 120° C., and in other embodiments from about 90 to about 110° C. After or in conjunction with cooling sub-step 37, the curable composition is conveyed downstream to step 15 of forming a green membrane.

Reactor Configuration

In one or more embodiments, the process of preparing a curable composition according to embodiments of the present invention can be performed using two mixing devices (e.g. two extrusion devices) arranged in series. In this regard, reference can be made to FIG. 3, which shows system 100 including first extrusion device 110 followed in series by second extrusion device 140 with conduit 130 providing fluid communication between first extrusion device 110 and second extrusion device 140. As the skilled person appreciates, material flows from first extrusion device 110 through conduit 130 and into and through second extrusion device 140 during the step of preparing the curable composition.

Figure 3:
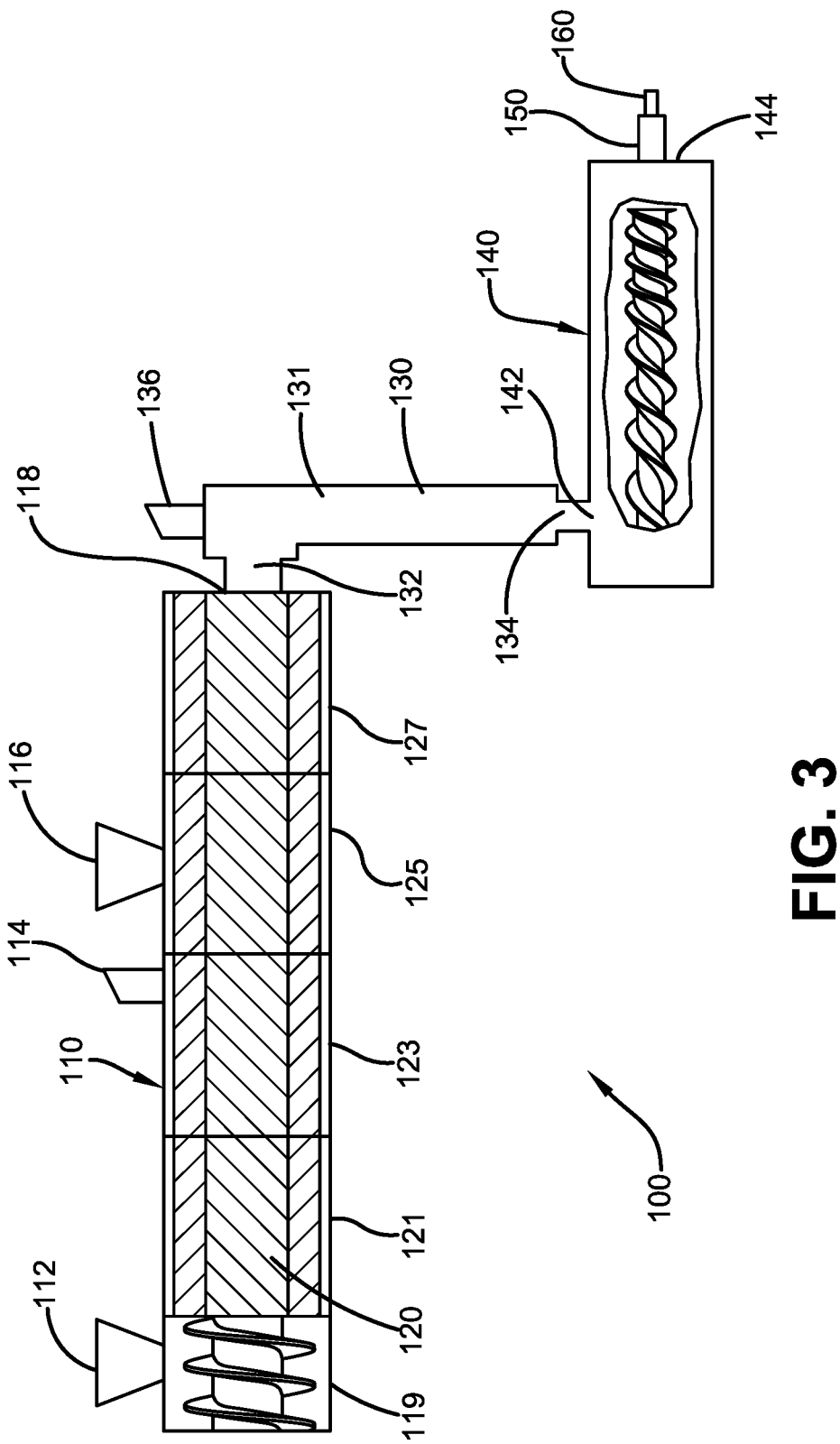
FIG. 3 is a schematic representation of a system for practicing one or more methods of the present invention.

First extrusion device 110 includes a main raw material inlet 112 and a downstream raw material inlet 116. It will be appreciated that first extruder 110 can be adapted to include additional raw material inlets, which can be used in practicing the present invention. Inlets 112, 116 provide an entry for raw materials to enter internal chamber 120 of first extruder 110. A material outlet 118, which is downstream of inlet 116, provides an outlet for material to exit cavity 120. As also shown, and as will be described in greater detail below, extruder 110 may be described with reference to multiple zones, which may be characterized by one or more characteristics such as the equipment within any given zone, conditions to which the material within the zone is subjected, and/or the manner in which the material within the cavity is impacted within any particular zone. As shown in FIG. 3, extruder 110 includes a material feed zone 119, a first mixing zone 121, a second mixing zone 123, a third mixing zone 125, and a fourth mixing zone 127. A volatiles outlet 114 may be disposed between first inlet 112 and second inlet 116. For example, as shown in FIG. 3, outlet 114 may exist within second mixing zone 123. Volatiles outlet 114 may be in communication with a pump or other device to draw a vacuum on internal chamber 120, particularly within zone 125.

As generally shown in FIG. 3, device 110 is a planetary extruder. Planetary extruders and their use in making curable compositions are generally known in the art as described in U.S. Publication No. 2015/0076743, which is incorporated herein by reference. Those skilled in the art appreciate that other extruder devices can be employed, such as single-screw or twin-screw mixing extruders, and Farrell continuous mixers.

During operation, one or more ingredients of the curable composition can be introduced to device 110 via inlet 112 and initial mixing and downstream conveying takes place within feed zone 119. Downstream of zone 119, high-shear mixing takes place within first mixing zone 121, while the composition is conveyed downstream. Downstream of zone 121, continued mixing, material cooling, and optional venting (via outlet 114) takes place within a second mixing zone 123. Next, curatives can be introduced via inlet 116 within third mixing zone 125, while the composition is conveyed downstream toward zone 127, where material heating prior to discharge at outlet 118 takes place.

It should be appreciated that the design of any given zone can be manipulated to achieve one or more desired performance goals or tasks, and therefore device 110 can be described with reference to or include additional zones or sub-zones in addition to those described. The zones that have been described are so described primarily to complement the process description offered above, and those skilled in the art appreciate that the extruder can include additional zones or the zones so described may include one or more sub-zones. For example, zone 123 may include a sub-zone upstream of outlet 114 where flow of material is restricted to thereby create headspace within chamber 120 proximate to outlet 114. As those skilled in the art appreciate, flow can be restricted by use of back-end spindles or screws, or by use of physical restrictions within the cavity. Also, device 110 can be equipped with heating or cooling equipment to manage the temperature of the material within the device. These heating and/or cooling implements may include heating jackets or fluid-carrying coils that surround cavity 120 within one or more of the zones. The skilled person will appreciate that the temperature of the composition at any given location within chamber 120 can be manipulated by several techniques, or a combination of techniques, including the mixing intensity and flow pressure within the extruder. For example, the temperature of the composition within the extruder can be increased by increasing the mixing shear, or the temperature reduced by lowering the mixing shear at any given location along the length of the device. In particular embodiments, the temperature of the composition within zone 127 is increased by mixing energy and/or by restricting flow; this can be accomplished by the size of outlet 118 relative to chamber 120 and the flow of material within zone 127.

In one or more embodiments, conduit 130 includes an inlet 132 in communication with outlet 118 of extruder 120. Conduit 130 also includes outlet 134 in communication with inlet 142 of extruder 140. Conduit 130 further includes at least one volatile outlet 136 in fluid communication with internal chamber 131 of conduit 130. According to aspects of the invention, conduit 130 is otherwise air-tight or adapted to allow for degassing by vacuum. In one or more embodiments, conduit 130 is simply a conduit that does not include any mechanical conveying means (e.g. the device does not include a screw). As suggested above, the conduit provides greater free space to thereby expose a greater amount of the material surface area relative to the free space available within device 110. In one or more embodiments, during operation of the system, the volume of the free space within conduit 130 relative to the volume of conduit 130 occupied by the rubber composition is greater than 1:1, in other embodiments greater than 1.5:1, in other embodiments 2:1, and in other embodiments greater than 3:1.

During operation, material processed within extruder 110 (e.g. the curable rubber composition) is extruded into cavity 131 of conduit 130 via inlet 132. Volatiles contained within the material being processed are vented through outlet 136. Outlet 136 may optionally be in communication with a pump or other device to draw a vacuum on internal chamber 131. In lieu of or in addition thereto, cavity 131 is adapted, relative to the size and/or restrictions placed on the material within fourth zone 127 of extruder 110, to cause a pressure drop as material enters cavity 131, thereby facilitating volatilization of volatiles. Also, in one or more embodiments, material being extruded into cavity 131 can be mechanically manipulated (e.g. chopped) to thereby further enhance volatilization of volatiles within the material. Those skilled in the art appreciate that a variety of tools can be used to manipulate the polymeric composition and thereby increase the surface area thereof, which will facilitate removal of volatiles. These devices may include, for example, pelletizing cutters or ring cutters.

In one or more embodiments, extruder device 140 includes inlet 142, which is in fluid communication with outlet 144 through internal chamber 141. Outlet 144 is in fluid communication with a die 150 adapted to provide a generally rectangular extrudate (e.g. a sheeting die, which can be as wide as 12 feet) that can then be calendared into sheet material. During operation, material enters internal chamber 141 through inlet 142 and is conveyed under sufficient force toward outlet 144 so that the material can be extruded through die 150. In one or more embodiments, extruder device 140 can include a roller-head die extruder.

As discussed above, the extrudate is fabricated into a green sheet or panel and subsequently cured into a cured membrane or panel. The cured membrane may be further fabricated, such as by cutting trimming, and then rolled for shipment. According to embodiments of the invention, the green membrane panel can optionally be cured in the absence of pressure or tension that is conventionally required to cure rubber membranes (e.g. pressure exerted by an autoclave). It is believed that this advantage is realized, at least in part, by the fact that the volatiles within the curable composition are substantially removed by aspects of the invention.

INDUSTRIAL APPLICABILITY

In one or more embodiments, the membranes of this invention can be used as roofing membranes. As the skilled person will understand, the membranes can be installed by unrolling a roll of the membrane over the roof substructure in a conventional fashion and attaching the membrane to the roof using a field applied adhesive or mechanical fasteners. Field seams are prepared by overlapping the edges of a rubber sheet with the edges of an adjacent rubber sheet. The width of the seam can vary depending on the requirements specified by the architect, building contractor, or roofing contractor. Seams can be joined with conventional adhesives such as, for example, a butyl-based lap splice adhesive. Field seams can also be formed by using a seam tape. A primer may optionally be applied prior to application of the seam tape.

In other embodiments, the membrane can receive a pressure-sensitive adhesive prior to delivery to an installation site. For example, the membranes can receive a layer of melt-applied pressure-sensitive adhesive after being cured. A release member can then be applied to the layer of pressure-sensitive adhesive, and then the membrane can be rolled for shipment. In this regard, U.S. Publication Nos. 2016/0230392, 2017/0015083, and 2020/0299965 are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A process for the continuous production of cured rubber membrane, the process comprising:
   (i) forming a first composition including ethylene-propylene-diene rubber;
   (ii) mixing the first composition under high shear and increasing the temperature of the first composition to a temperature of about 130 to about 175° C.;
   (iii) cooling the first composition to a temperature of about 70 to about 130° C.;
   (iv) after cooling the first composition, adding a curative to the first composition to thereby form a continuous stream of curable rubber composition, where the curative includes sulfur;
   (v) after adding a curative, increasing the temperature of the continuous stream of curable rubber composition to a temperature of about 135 to about 165 C;
   (vi) after increasing the temperature of the continuous stream of curable composition, removing volatiles from the continuous stream of curable composition;
   (vii) forming the continuous stream of curable rubber composition into a continuous green-rubber extrudate;
   (viii) curing the continuous green-rubber extrudate to form a continuous cured membrane; and
   ix) fabricating the continuous cured membrane into rolls of cured membrane, where the curable rubber composition is characterized by at least one of a too at 190° C. of from about 1 to about 12 minutes and a T5 at 135° C. of from about 5 to about 20 minutes.

2. The process of claim 1, further comprising removing volatiles from the first composition prior to cooling the first composition.

3. The process of claim 1, wherein the curable composition includes a benzothiazole sulfonamide and a thiuram sulfide in the absence of a thiazole.

4. The process of claim 1, wherein the curable composition includes carbon black and/or wherein the curable composition includes silica and a coupling agent.

5. The process of claim 2, wherein adding a curative includes introducing sulfur to a continuous mixing and conveying apparatus that contains the continuous stream of curable rubber composition, and wherein removing volatiles from the continuous stream of curable composition takes place outside of the mixing and conveying apparatus.

6. The process of claim 2, wherein removing volatiles takes place at reduced pressure.

*   *   *   *   *